E. SCHÄRER.
BRACKET FOR STAGING AND SCAFFOLDING.
APPLICATION FILED OCT. 19, 1910.
1,082,448.
Patented Dec. 23, 1913.
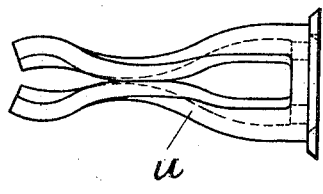
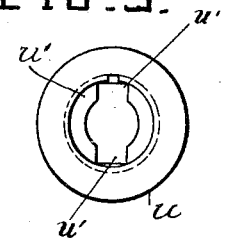
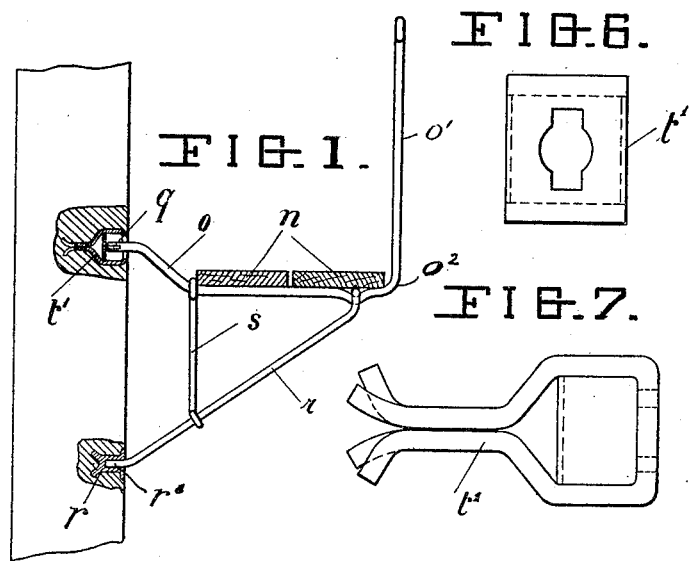
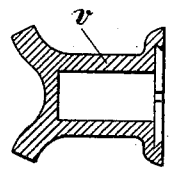
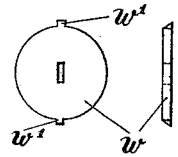
Witnesses:
Inventor:

UNITED STATES PATENT OFFICE.

EMIL SCHÄRER, OF ZURICH, SWITZERLAND.

BRACKET FOR STAGING AND SCAFFOLDING.

1,082,448.   Specification of Letters Patent.   Patented Dec. 23, 1913.

Application filed October 19, 1910. Serial No. 587,875.

*To all whom it may concern:*

Be it known that I, EMIL SCHÄRER, a citizen of the Swiss Confederation, residing at 86 Steinwiesstrasse, Zurich, Switzerland, have invented new and useful Improvements in Brackets for Staging and Scaffolding, of which the following is a specification.

The present invention relates to brackets adapted to be used for staging and scaffolding.

An object of the invention is to provide means which may be readily fitted to and detached from any building for instance for repairing purposes, painting or the like.

A further object of the invention is to provide suitable means to make the attachment of brackets perfectly secure to prevent any accident to the men using the scaffold supported by the brackets.

In the drawing Figure 1 shows a bracket fixed to the wall of a building. Fig. 2 shows a holding socket adapted to be fixed in a wall. Fig. 3 is a front view of the socket shown in Fig. 2. Fig. 4 shows another form of a socket and Fig. 5 shows a cover for the socket, in front and side views. Fig. 6 is a front view of a third form of a socket and Fig. 7 is a side view thereof.

Similar letters refer to similar parts throughout the specification.

To form a platform suitable for making repairs on the outside of the walls of the buildings, brackets are used. On the bars $o$, of the brackets boards $n$ are placed which serve as a stand for the operator. The upper ends of the uprights $o'$ may be connected by a chain, bar or the like to serve as a safeguard. The bracket consists of a bar $o$ bent at right angles at $o^2$. The free end of the horizontal portion of bar $o$, is round in cross section and is provided with two projections $q$ diametrally opposite each other. On the horizontal portion of bar $o$, one end of a bar $r$ is rigidly fixed, the other end of which is slightly bent so as to run parallel to the free end of bar $o$. To stiffen the bracket, truss $s$ is provided rigidly fixed to bar $o$ and to bar $r$. The free end of bar $o$ lies in the opening of a socket $u$ fixed in the wall. The socket $u$ is closed at its front end by a disk $u^1$ which may be flush with the wall of the building. In said disk is a circular opening having two recesses $u^1$ arranged opposite each other. The dimensions of the opening in said disk are such that the free end of the bar $o$ may be easily inserted. The recesses $u^1$ are situated in a vertical line when the socket is correctly placed in the wall and the bracket has to be turned when removed from the position shown in Fig. 1. The free end $r^1$ of the bar $r$ is inserted (Fig. 1) in a socket $v$ (Fig. 4) having a straight cylindrical bore to allow the insertion of the free ends of the bars $o$ and $r$. The openings of the sockets $u$ and $v$ are made wide enough to give sufficient play. To cover the openings of the sockets $v$, when not in use, covers $w$ may be employed which may be placed in a recess of the socket and which are held by lugs $w^1$ engaging a groove of the socket. To allow insertion of the lugs $w^1$ the outwall of the groove is recessed. The socket for the end of bar $o$ may be made as shown in Figs. 6 and 7. The socket $t^1$ is made of a piece of iron of rectangular cross section, the front end having the opening for the end of bar $o$. The sockets $t$ and $v$ are fixed in the walls of the building at regular distances apart, so that a stage may be erected for any part of the wall of a building.

I wish to point out that various changes in the form and dimensions of the parts may be made without departing from the spirit of the invention.

What I claim is—

The combination with an exterior wall, of a scaffolding socket therein and substantially flush with the exterior face of said wall and provided with an opening having substantially vertically disposed extensions, a scaffolding bracket member having horizontally disposed projections adapted to be inserted into said sockets and turned to an upright position to dispose its projections out of registry with the extensions of the opening in said socket, the portion of the bracket member entering said socket being loosely mounted therein whereby swinging movement is permitted said bracket member, a socket located in the wall beneath the first mentioned socket, and a bar connected to said bracket adjacent its outer end and adapted to enter said second socket when the bracket is locked in the first socket, said bar and receiving socket constituting means for preventing the rotation of the bracket and means for bracing said scaffolding member to sustain the same in a horizontal position, substantially as described.

In testimony whereof I affix my signature in presence of two witnesses.

EMIL SCHÄRER.

Witnesses:
ARTHUR J. BUNDY,
AUGUST RUEGG.

Copies of this patent may be obtained for five cents each, by addressing the "Commissioner of Patents, Washington, D. C."